United States Patent
Cai et al.

(10) Patent No.: US 10,986,680 B2
(45) Date of Patent: Apr. 20, 2021

(54) TERMINAL COMMUNICATION METHOD AND COMMUNICATIONS DEVICE

(71) Applicant: Huawei Technologies Co., Ltd., Shenzhen (CN)

(72) Inventors: Yu Cai, Beijing (CN); Yongbo Zeng, Beijing (CN); Da Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 28 days.

(21) Appl. No.: 16/477,361

(22) PCT Filed: Jan. 26, 2017

(86) PCT No.: PCT/CN2017/072743
§ 371 (c)(1),
(2) Date: Jul. 11, 2019

(87) PCT Pub. No.: WO2018/129770
PCT Pub. Date: Jul. 19, 2018

(65) Prior Publication Data
US 2019/0387557 A1  Dec. 19, 2019

(30) Foreign Application Priority Data
Jan. 11, 2017 (CN) .......................... 201710020832.3

(51) Int. Cl.
*H04W 72/02* (2009.01)
*H04W 76/14* (2018.01)
(Continued)

(52) U.S. Cl.
CPC ........... *H04W 76/14* (2018.02); *H04L 5/0005* (2013.01); *H04L 27/0006* (2013.01); *H04L 69/22* (2013.01); *H04W 72/0446* (2013.01)

(58) Field of Classification Search
None
See application file for complete search history.

(56) References Cited

U.S. PATENT DOCUMENTS

2013/0039243 A1* 2/2013 Park ..................... H04W 68/02
370/311
2017/0142647 A1 5/2017 Su et al.
2017/0208587 A1 7/2017 Chae et al.

FOREIGN PATENT DOCUMENTS

CN 104244449 A 12/2014
EP 3001710 A1 * 3/2016 ........ H04W 36/0061
(Continued)

OTHER PUBLICATIONS

Foreign Communication From a Counterpart Application, PCT Application No. PCT/CN2017/072743, English Translation of International Search Report dated Oct. 11, 2017, 3 pages.
(Continued)

*Primary Examiner* — Ayanah S George
(74) *Attorney, Agent, or Firm* — Conley Rose, P.C.

(57) ABSTRACT

A terminal communication method includes obtaining, by a communications device, start information and length information, where the start information is used to indicate a start location of a first time resource. The method further comprises determining the first time resource based on the start information and the length information, where the first time resource is used to indicate a transmit or receive time resource of a sidelink signal.

20 Claims, 3 Drawing Sheets

A communications device obtains start information and subframe gap information — S201

The communications device determines a first time resource based on the start information and the subframe gap information, where the first time resource is used to indicate a transmit time resource of a sidelink signal — S202

(51) Int. Cl.
*H04L 5/00* (2006.01)
*H04L 27/00* (2006.01)
*H04L 29/06* (2006.01)
*H04W 72/04* (2009.01)

(56) References Cited

FOREIGN PATENT DOCUMENTS

| EP | 3001710 A1 | 3/2016 | |
|---|---|---|---|
| WO | 2015182982 A1 | 12/2015 | |
| WO | 2016019512 A1 | 2/2016 | |
| WO | 2016022924 A1 | 2/2016 | |
| WO | WO-2016022924 A1 * | 2/2016 | ........ H04W 72/0446 |
| WO | 2016073107 A1 | 5/2016 | |

OTHER PUBLICATIONS

Foreign Communication From a Counterpart Application, PCT Application No. PCT/CN2017/072743, English Translation of Written Opinion dated Oct. 11, 2017, 5 pages.
Panasonic, "Control signalling/channel design in D2D communication," XP050786892, R1-141217, 3GPP TSG RAN WG1 Meeting #76bis, Shenzhen, China, Mar. 31-Apr. 4, 2014, 4 pages.
3GPP TS 36.213 V14.0.0, "3rd Generation Partnership Project; Technical Specification Group Radio Access Network; Evolved Universal Terrestrial Radio Access (E-UTRA); Physical layer procedures (Release 14)," XP051664441, Sep. 2016, 404 pages.
Foreign Communication From a Counterpart Application, European Application No. 17891390.1, Extended European Search Report dated Dec. 2, 2019, 9 pages.

* cited by examiner

TERMINAL COMMUNICATION METHOD AND COMMUNICATIONS DEVICE

CROSS-REFERENCE TO RELATED APPLICATIONS

This application is a national stage of International Application No. PCT/CN2017/072743, filed on Jan. 26, 2017, which claims priority to Chinese Patent Application No. 201710020832.3 filed on Jan. 11, 2017. Both of the aforementioned applications are hereby incorporated by reference in their entireties.

TECHNICAL FIELD

This application relates to communications technologies, and in particular, to a terminal communication method and a communications device.

BACKGROUND

Device-to-device (Device-to-Device, D2D) communication based on a cellular network, also referred to a proximity service (Proximity Service, ProSe) in the 3rd Generation Partnership Project (3rd Generation Partnership Project, 3GPP), is a new technology that allows, under system control, terminals to directly communicate with each other by multiplexing cell resources. The new technology can increase spectrum efficiency of a cellular communications system, reduce transmit power of a terminal, and alleviate spectrum resource shortage of a wireless communications system to some extent. To improve security and intelligence of a traffic system, emerging intelligent traffic is applied in D2D communication. Specifically, development of the intelligent traffic system mainly focuses on the field of intelligent highway traffic systems, also referred to as the Internet of Vehicles (vehicle to everything, V2X), where vehicle to infrastructure (vehicle to infrastructure, V2I) and vehicle to vehicle (vehicle to vehicle, V2V) are collectively referred to as V2X. The V2X technology allows a vehicle to continuously communicate with all other nearby vehicles and road infrastructure, for example, with infrastructure such as a traffic light, a campus, or a railway crossing. A communications device used by a vehicle may be an in-vehicle embedded remote information processing system, or a mobile device such as a smartphone. The V2X is a key technology of a future intelligent traffic and transportation system. The technology enables communication between vehicles, between a vehicle and a base station, and between base stations, so as to obtain a series of traffic information such as real-time road conditions, road information, and pedestrian information to improve driving safety, reduce congestion, improve traffic efficiency, provide in-vehicle entertainment information, and the like.

At present, in the V2X implemented based on the D2D communication, service traffic of a terminal is periodic. Therefore, a terminal resource reservation solution is added in the V2X technology, and the terminal may notify another terminal that the terminal needs to reserve a future time-frequency resource. Certainly, the terminal also needs to consider a resource reserved by the another terminal. A terminal supporting D2D not only needs to perform transmission or reception in sidelink (sidelink), but also needs to perform transmission in uplink (uplink, UL) or perform reception in downlink (downlink, DL). When a terminal has only one transmit link, the terminal cannot simultaneously transmit signals in sidelink and in UL. Similarly, when a terminal has only one transmit link, the terminal cannot simultaneously receive signals in sidelink and in DL. In the prior art, D2D discovery (D2D discovery) defines a gap (gap) mechanism to avoid conflicts. If a terminal is configured with a receive gap, and needs to listen to sidelink discovery announcements by using the gap, the terminal uses the configured gap to listen to the sidelink discovery announcements. Similarly, if the terminal is configured with a transmit gap, and needs to transmit sidelink discovery announcements by using the gap, the terminal uses the configured gap to transmit the sidelink discovery announcements. When the gap is configured for the terminal, a gap pattern is indicated by using a gap period, a gap offset, and a gap subframe bitmap (gap subframe bitmap) in the D2D discovery. The gap period indicates a period in which the gap subframe bitmap is repeated, the gap offset indicates an offset of a start of a first period of the gap pattern relative to a start of a system frame number (system frame number, STN) 0, and the gap subframe bitmap is a bit string, where a bit with a value 1 indicates that the terminal is allowed to use a corresponding subframe to perform a sidelink discovery operation. In this case, a base station may schedule a UT operation or a DL operation of the terminal in another subframe without a conflict with a sidelink operation of the terminal.

However, in the prior art, when the transmit gap is indicated, each bit in the gap subframe bitmap can correspond only to a unique subframe, leading to excessive overheads.

SUMMARY

This application provides a terminal communication method and a communications device, to resolve a prior-art problem that each bit in a gap subframe bitmap can be corresponding only to a unique subframe, and resource indication overheads are excessively large.

A first aspect of this application provides a terminal communication method, including:

obtaining, by a communications device, start information and length information, where the start information is used to indicate a start location of a first time resource; and determining, by the communications device, the first time resource based on the start information and the length information, where the first time resource is used to indicate a transmit or receive time resource of a sidelink signal.

Optionally, the first time resource includes at least one subframe set, and each subframe set includes at least one subframe; and the length information is used to determine a quantity of subframes in each subframe set.

Optionally, the obtaining, by a communications device, start information and length information includes:

receiving, by the communications device, indication information, where the indication information includes offset information and the length information; or obtaining, by the communications device, preset length information, and receiving the indication information, where the indication information includes offset information; and determining, by the communications device, the start information based on the offset information.

Optionally, the first time resource includes a second time resource, and the communications device receives the sidelink signal based on the second time resource; and the determining, by the communications device, the first time resource based on the start information and the length information includes:

determining, by the communications device, the second time resource based on the start information, the length information, and a first parameter; or determining, by the communications device, the second time resource based on the start information, the length information, the first parameter, and a second parameter.

Optionally, the first time resource includes a third time resource, and the communications device sends the sidelink signal based on the third time resource; and the method further includes:

obtaining, by the communications device, period information; and the determining, by the communications device, the first time resource based on the start information and the length information includes:

determining, by the communications device, the third time resource based on the start information, the length information and the period information.

Optionally, the obtaining, by the communications device, period information includes:

receiving, by the communications device, indication information, where the indication information includes the period information; or obtaining, by the communications device, preset period information.

Optionally, the method may further include:

obtaining, by the communications device, resource pool information, where when the communications device is a terminal, the resource pool is used to indicate a resource pool used when the terminal sends or receives a signal in sidelink; or when the communications device is a base station, the resource pool is used to indicate a resource pool used when a terminal interacting with the base station sends or receives a signal in sidelink.

A second aspect of this application provides a communications device, where the communications device may be a terminal or a base station and the communications device includes:

an obtaining module, configured to obtain start information and length information, where the start information is used to indicate a start location of a first time resource; and a determining module, configured to determine the first time resource based on the start information and the length information, where the first time resource is used to indicate a transmit or receive time resource of a sidelink signal.

Optionally, the first time resource includes at least one subframe set, and each subframe set includes at least one subframe; and the length information is used to determine a quantity of subframes in each subframe set.

Optionally, the obtaining module is specifically configured to receive indication information, where the indication information includes offset information and the length information; or obtain preset length information, and receive the indication information, where the indication information includes offset information; and determine the start information based on the offset information.

Optionally, the first time resource includes a second time resource, and the communications device receives the sidelink signal based on the second time resource; and the determining module is specifically configured to determine the second time resource based on the start information, the length information, and a first parameter; or determine the second time resource based on the start information, the length information, the first parameter, and a second parameter.

Optionally, the first time resource includes a third time resource, and the communications device sends the sidelink signal based on the third time resource;

the obtaining module is further configured to obtain period information; and the determining module is specifically configured to determine the third time resource based on the start information, the length information, and the period information.

Optionally, the obtaining module is specifically configured to receive indication information, where the indication information includes the period information; or obtain preset period information.

Optionally, the obtaining module is further configured to obtain resource pool information, where when the communications device is a terminal, the resource pool is used to indicate a resource pool used when the terminal sends or receives a signal in sidelink; or when the communications device is a base station, the resource pool is used to indicate a resource pool used when a terminal interacting with the base station sends or receives a signal in sidelink.

A third aspect of this application provides a communications device, where the communications device includes a processor and a memory, the memory is configured to store a program, and the processor invokes the program stored in the memory to perform the method provided in the first aspect of this application.

A fourth aspect of this application provides a communications device, where the communications device includes at least one processing element (or chip) configured to perform the method in the first aspect.

A fifth aspect of this application provides a program, and when executed by a processor, the program is used to perform the method in the first aspect.

A sixth aspect of this application provides a program product, for example, a computer-readable storage medium, including the program in the fifth aspect.

A seventh aspect of this application provides a computer-readable storage medium, where the computer-readable storage medium stores an instruction, and when the instruction runs on a computer, the computer is enabled to perform the method in the first aspect.

According to the terminal communication method and the communications device provided in this application, the communications device obtains the start information and the length information, determines the first time resource based on the start information and the length information, and further determines the transmit or receive time resource of the sidelink signal based on the first time resource. This implements that the transmit or receive time resource of the sidelink signal may be determined by using a few bits, and there is no need to determine, one by one based on a value of a bit string, whether each subframe belongs to the first time resource. Therefore, overheads are greatly reduced.

An eighth aspect of this application provides a terminal communication method, including:

obtaining, by a communications device, start information and subframe gap information, where the start information is used to indicate a start location of a first time resource, and the subframe gap information s used to indicate a gap between two adjacent subframes in the first time resource; and determining, by the communications device, the first time resource based on the start information and the subframe gap information, where the first time resource is used to indicate a transmit time resource of a sidelink signal.

Optionally, the obtaining, by a communications device, start information and subframe gap information includes:

receiving, by the communications device, indication information, where the indication information includes offset information and the subframe gap information; or obtaining, by the communications device, preset subframe gap information, and receiving indication information, where the indication information includes offset information; and determining, by the communications device, the start information based on the offset information.

Optionally, the method further includes:

obtaining, by the communications device, period information; and the determining, by the communications device, the first time resource based on the start information and the subframe gap information includes:

determining, by the communications device, the first time resource based on the start information, the subframe gap information, and the period information.

Optionally, the method further includes:

obtaining, by the communications device, a relative offset value of the first time resource and a second time resource, where the communications device receives the sidelink signal based on the second time resource; and the determining, by the communications device, the first time resource based on the start information and the subframe gap information includes:

determining, by the communications device, the first time resource based on the start information, the subframe gap information, and the relative offset value of the first time resource and the second time resource.

Optionally, the method further includes: obtaining, by the communications device, resource pool information, where when the communications device is a terminal, the resource pool is used to indicate a resource pool used when the terminal sends or receives a signal in sidelink; or when the communications device is a base station, the resource pool is used to indicate a resource pool used when a terminal interacting with the base station sends or receives a signal in sidelink.

A ninth aspect of this application provides a communications device, including:

an obtaining module, configured to obtain start information and subframe gap information, where the start information is used to indicate a start location of a first time resource, and the subframe gap information is used to indicate a gap between two adjacent subframes in the first time resource; and a determining module, configured to determine the first time resource based on the start information and the subframe gap information, where the first time resource is used to indicate a transmit time resource of a sidelink signal.

Optionally, the obtaining module is specifically configured to receive indication information, where the indication information includes offset information and the subframe gap information; or is specifically configured to obtain preset subframe gap information, and receive indication information, where the indication information includes offset information; and correspondingly, the determining module is further configured to determine the start information based on the offset information.

Optionally, the obtaining module is further configured to obtain period information; and the determining module is specifically configured to determine the first time resource based on the start information, the subframe gap information, and the period information.

Optionally, the obtaining module is further configured to obtain a relative offset value of the first time resource and a second time resource, where the communications device receives the sidelink signal based on the second time resource; and the determining module is specifically configured to determine the first time resource based on the start information, the subframe gap information, and the relative offset value of the first time resource and the second time resource.

Optionally, the obtaining module is further configured to obtain resource pool information, where when the communications device is a terminal, the resource pool is used to indicate a resource pool used when the terminal sends or receives a signal in sidelink; or when the communications device is a base station, the resource pool is used to indicate a resource pool used when a terminal interacting with the base station sends or receives a signal in sidelink.

A tenth aspect of this application provides a communications device, where the communications device includes a processor and a memory, the memory is configured to store a program, and the processor invokes the program stored in the memory to perform the method provided in the eighth aspect of this application.

An eleventh aspect of this application provides a communications device, where the communications device includes at least one processing element (or chip) configured to perform the method in the eighth aspect.

A twelfth aspect of this application provides a program, and when executed by a processor, the program is used to perform the method in the eighth aspect.

A thirteenth aspect of this application provides a program product, for example, a computer-readable storage medium, including the program in the twelfth aspect.

A fourteenth aspect of this application provides a computer-readable storage medium, where the computer-readable storage medium stores an instruction, and when the instruction runs on a computer, the computer is enabled to perform the method in the eighth aspect.

According to the terminal communication method and the communications device provided in this application, the communications device obtains the start information and the subframe gap information, determines the first time resource based on the start information and the subframe gap information, and further determines the transmit time resource of the sidelink signal based on the first time resource. This implements that the transmit time resource of the sidelink signal may be determined by using a few bits, and there is no need to determine, one by one based on a value of a bit string, whether each subframe belongs to the first time resource. Therefore, overheads are greatly reduced.

DESCRIPTION OF EMBODIMENTS

Figure 1:
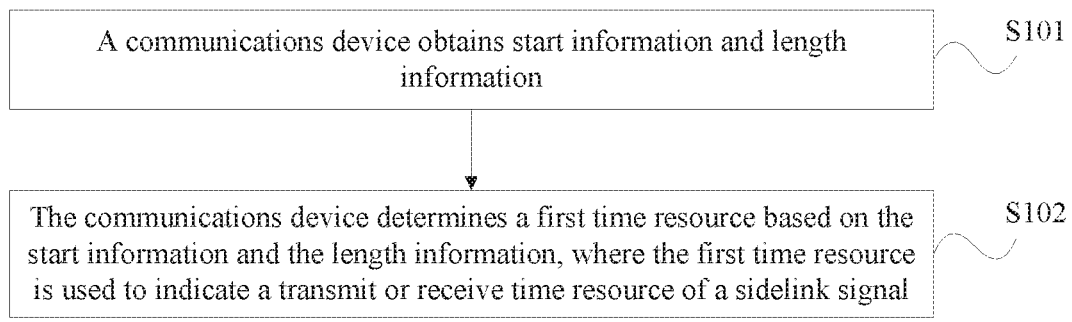
FIG. 1 is a schematic flowchart of a terminal communication method according to an embodiment of this application.

The following describes some terms in this application for ease of understanding by a person skilled in the art.

A base station is also referred to as a radio access network (Radio Access Network, RAN) device, and is a device that connects a terminal to a radio network. The base station may be a base transceiver station (Base Transceiver Station, BTS) in a Global System for Mobile Communications (Global System of Mobile communication, GSM) or Code Division Multiple Access (Code Division Multiple Access, CDMA) system, or a NodeB (NodeB, NB) in a Wideband Code Division Multiple Access (Wideband Code Division Multiple Access, WCDMA) system, or an evolved. NodeB (Evolutional Node B, eNB or eNodeB) in a Long Term Evolution (Long Term Evolution, LTE) system, or a relay station or an access point, or a base station in a future 5G network, or the like. This is not limited herein.

A terminal may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks by using a radio access network (Radio Access Network, RAN). The wireless terminal may be a mobile terminal, such as a mobile phone (or referred to as a "cellular" phone) and a computer with a mobile terminal, for example, may be a portable, pocket-sized, handheld, computer built-in, or in-vehicle mobile apparatus, and exchanges voice and/or data with the radio access network. For example, the wireless terminal may be a device such as a personal communication service (Personal Communication Service, PCS) phone, a cordless telephone set, a Session Initiation Protocol (Session Initiation Protocol, SIP) phone, a wireless local loop (Wireless Local Loop, WLL) station, or a personal digital assistant (Personal Digital Assistant, PDA). The wireless terminal may also be referred to as a system, a subscriber unit (Subscriber Unit), a subscriber station (Subscriber Station), a mobile station (Mobile Station), a mobile console (Mobile), a remote station (Remote Station), a remote terminal (Remote Terminal), an access terminal (Access Terminal), a user terminal (User Terminal), a user agent (User Agent), or a user device (User Device or User Equipment). This is not limited herein.

In this application, "plurality" means at least two. "And/or" describes an association relationship for describing associated objects and represents that three relationships may exist. For example, A and/or B may represent the following three cases: Only A exists, both A and B exist, and only B exists. The character "/" usually indicates an "or" relationship between the associated objects.

In V2X implemented based on D2D communication, terminals may directly communicate with each other. In the V2X, service traffic of a terminal is periodic. For example, a shortest period of a cooperative awareness message (Cooperative Awareness Message, CAM) is 100 milliseconds (ms) and a longest period is 1 second (s). The terminal is capable of predicting the periodic feature of the traffic of the terminal. A terminal resource reservation solution is added in the V2X, and the terminal may notify another terminal that the terminal needs to reserve a future time-frequency resource. In addition, when selecting a time-frequency resource for sending data, the terminal needs to consider a resource reserved by the another terminal, so as to avoid selecting the resource that has been reserved by the another terminal as much as possible. That is, the terminal needs to perform monitoring when selecting a time-frequency resource. In the current solution, the terminal selects Y subframes as possible candidate resources. For any subframe n in the Y subframes, UE needs to monitor a subframe n−100*k, where k is a first parameter. A minimum value of Y and a value set of k are preconfigured, or configured by a network-side device. In a current standard, a value range of k is [1, 10], and [1, 10] represents a set (1, 3, 4, 5, 6, 7, 8, 9, 10). When k is configured to be k=1, 10, for the any subframe n in the Y subframes, the terminal needs to monitor a subframe n−100 and a subframe n−1000. In gap indication information sent by a base station or the terminal, a gap pattern is indicated by using a gap period, a gap offset, and a gap subframe bitmap. The gap subframe bitmap is a bit string, where a value 1 indicates that the terminal is allowed to use a corresponding subframe to perform sidelink discovery. Then, assuming that the terminal sends data in sidelink once every 1000 ms performs resource selection once every 10 s on average, and needs to perform receiving in sidelink during resource selection, to indicate a transmit gap, the gap subframe bitmap in the gap pattern requires 1000 bits; and to indicate a receive gap, the gap subframe bitmap in the gap pattern requires 10000 bits. It can be learned that overheads are very large.

The solutions provided in this application are intended to reduce overheads in a gap indication process.

FIG. 1 is a schematic flowchart of a terminal communication method according to an embodiment of this application. As shown in FIG. 1, the method includes the following steps.

S101: A communications device obtains start information and length information.

The start information is used to indicate a start location of a first time resource.

The first time resource may include one or more subframes, and the first time resource is used to indicate a transmit or receive time resource of a sidelink signal.

S102: The communications device determines the first time resource based on the start information and the length information.

The communications device may be a base station, or may be a terminal. A base station side and a terminal side perform a same operation, and both need to determine, according to an indication, a time resource used by a terminal to send or receive a signal in sidelink.

When the communications device is a terminal, in the first time resource, the terminal may first send or receive a sidelink signal. Optionally, in the first time resource, the terminal may not send an uplink signal or receive a downlink signal.

When the communications device is a base station, the base station determines that a terminal interacting with the base station first sends or receives a sidelink signal in the first time resource. Then when the base station schedules the terminal to send an uplink signal or receive a downlink signal, the first time resource may be eschewed.

Specifically, when the communications device obtains the start information, the communications device may determine the start location of the first time resource. Further, the communications device may determine, based on the length information, several subframes starting from the start location as the first time resource. In this case, only a few bits are needed for indication, and there is no need to indicate each subframe one by one by using a bit string.

In this embodiment, the communications device obtains the start information and the length information, determines the first time resource based on the start information and the length information, and further determines the transmit or receive time resource of the sidelink signal based on the first time resource. This implements that the transmit or receive time resource of the sidelink signal may be determined by using a few bits, and there is no need to determine, one by one based on a value of a bit string, whether each subframe belongs to the first time resource. Therefore, overheads are greatly reduced.

Optionally, the base station or the terminal may indicate the start information by using indication information.

The communications device receives indication information sent by another communications device. Optionally, a base station may send indication information to the terminal, or a terminal may send indication information to the terminal, or a terminal may send indication information to the base station.

The indication information may include offset information and the length information.

Alternatively, the indication information includes offset information. A default value of the length information is used. In other words, preset length information is preset in the communications device. The preset length information may be preconfigured in the communications device, or may be pre-indicated by another communications device. This is not limited herein.

The communications device determines the start information based on the offset information. Optionally, the communications device determines the start information based on the offset information and preset reference information. The preset reference information may be a preset subframe, and the start location may be a location deviated from the preset subframe.

Optionally, the first time resource includes at least one subframe set, and each subframe set includes at least one subframe. In this implementation, the length information is used to determine a quantity of subframes in each subframe set.

When the first time resource includes a plurality of subframe sets, the plurality of subframe sets may cycle based on a fixed period, or may be deduced according to another rule. This is not limited herein.

Optionally, the first time resource includes a second time resource. The communications device receives the sidelink signal based on the second time resource.

That the communications device determines the first time resource based on the start information and the length information may be: The communications device determines the second time resource based on the start information, the length information, and a first parameter.

The first parameter may be a parameter used to determine a monitoring subframe by the terminal, where the monitoring subframe belongs to the second time resource. The first parameter may be represented by k. When the communications device is a terminal, the monitoring subframe is determined based on k. The terminal may monitor a resource in the monitoring subframe, and determine a data sending resource based on a monitoring result. k is an integer greater than 0.

Optionally, the offset information may be an offset value relative to the preset subframe. The preset subframe may be a start of a system frame number (system frame number, SFN) or a direct frame number (Direct frame number, DFN) #0, that is, a first subframe of an SFN/DFN 0 radio frame. The offset value relative to the preset subframe may be determined based on a candidate resource determined by the terminal. For example, the offset value relative to the preset subframe may be set to an offset of a start of a subframe in which the candidate resource is located relative to the preset subframe, or an offset of a start of a first subframe set of the first time resource relative to the preset subframe, or an offset of a last subframe set of the first time resource relative to the preset subframe. This is not limited herein.

On this basis, in an implementation, each subframe set of the second time resource is [m+offset−P*k, m+offset+duration−1−P*k] where offset is an offset value determined based on the offset information, a subframe to is a reference subframe of the offset value (namely, the preset subframe), (m+offset) is a start location of the second time resource, duration is a time length (a quantity of subframes in each subframe set) determined based on the length information, k is the first parameter, k is an integer greater than or equal to 1, and less than or equal to 10, and P is an integer greater than 0.

When P is 100, each subframe set of the second time resource is [m+offset−100*k, m+offset+duration−1−100*k]. It is assumed that k is configured to be k=2, 3, 10. Then the second time resource includes subframes [m+offset−200, m+offset+duration−201], subframes [m+offset−300, m+offset+duration−301], and subframes [m+offset−1000, m+offset+duration−1001].

In another implementation, each subframe set of the second time resource is [m+offset−P*k', m+offset+duration−1−P*k'], where offset is an offset value determined based on the offset information, a subframe to is a reference subframe of the offset value (namely, the preset subframe), (m+offset) is a start location of the second time resource, duration is a time length (a quantity of subframes in each subframe set) determined based on the length information, k'=k−k_max, where k_max is a maximum value in a value set of k, k is the first parameter, and k is an integer greater than or equal to 1, and less than or equal to 10, and P is an integer greater than 0.

It is assumed that k is configured to be k=2, 3, 10, and k_max is equal to 10. Then k' is equal to −8, −7, 0. In other words, the second time resource includes subframes [m+offset+800, m+offset+duration+799], subframes [m+offset+700, m+offset+duration+699], and subframes [m+offset, m+offset+duration−1].

In still another implementation, each subframe set of the second time resource is [m+offset−P*k'1, m+offset+duration−1−P*k'], where k'=k−k_min, k_min is a minimum value in a value set of k, k is the first parameter, k is an integer greater than or equal to 1, and less than or equal to 10. P is an integer greater than 0, offset is an offset value determined based on the offset information, a subframe m is a reference subframe of the offset value (namely, the preset subframe), (m+offset) is a start location of the second time resource, and duration is a time length (a quantity of subframes in each subframe set) determined based on the length information.

It is assumed that k is configured to be k=2, 3, 10, k_min is equal to 2, and k' is equal to 0, 1, 8. In other words, the second time resource includes subframes[m+offset−800, m+offset+duration−801], subframes [m+offset−100, m+offset+duration−101], and subframes [m+offset', m+offset+duration−1].

It should be noted that the subframe m may be a start of the SFN or DFN #0.

A subframe (m+offset−P*k) indicates a subframe that has a gap of "offset−P*k−1" subframes from the subframe m. If "offset−P*k−1" is a positive number, the subframe (m+offset−P*k) indicates a subframe that is "offset−P*k−1" subframes after the subframe m; if "offset−P*k−1" is a negative number, the subframe (m+offset−P*k) indicates a subframe that is "offset−P*k−1" subframes before the subframe m. All subframes in this application are understood with reference to this. Details are not repeated.

Optionally, duration indicates a time length, and may be set to a quantity of subframes of the candidate resource.

Optionally, when the first time resource includes the second time resource, that the communications device determines the first time resource based on the start information and the length information may be: The communications device determines the second time resource based on the start information, the length information, the first parameter, and a second parameter.

The second parameter may indicate a minimum value of a quantity of subframes in which the candidate resource is located. The first parameter is the same as that in the foregoing embodiment, and details are not repeated.

On this basis, each subframe set of the second time resource is [m+offset−P*k, m+offset+duration+M−1−P*k], where (m+offset) is a start location of the second time resource, offset is an offset value determined based on the offset information, a subframe m is a reference subframe of the offset value (namely, the preset subframe), duration is a time length determined based on the length information, k'=k−k_max, k_max is a maximum value in a value set of k, k is the first parameter, k is an integer greater than or equal to 1, and less than or equal to 10, and P is an integer greater than 0. M is the second parameter, namely, the minimum value of the quantity of subframes in which the candidate resource is located. In other words, the candidate resource includes at least M subframes.

M may be a default value preconfigured by the communications device. In this embodiment, a sum of duration and M indicates a quantity of subframes in each subframe set of the second time resource, and duration may be an increment of a quantity of subframes of the candidate resource relative to M.

It is assumed that k is configured to be k=2, 3, 10. k_min is equal to 2, and k' is equal to 0, 1, 8. In other words, the second time resource includes subframes [m+offset−200, m+offset+duration+M−201], subframes [m+offset−300, m+offset+duration+M−301], and subframes [m+offset−1000, m+offset+duration+M−1001].

Optionally, if the indication information includes only the offset information and the preset length information is used, each subframe set of the second time resource may be [m+offset−P*k, m+offset+M−1−P*k]. For the parameters, refer to the foregoing embodiment. Details are not repeated herein.

Further, subframes in the first time resource may be determined based on period information, and the communications device may obtain the period information.

Optionally, the period information may be carried in the indication information. In other words, the indication information includes offset information, length information, and the period information. Alternatively, the indication information includes offset information and period information, and preset length information is used as length information.

Optionally, the indication information includes offset information. Preset default values of both the period information and the length information are used.

When the first time resource includes a third time resource, that the communications device determines the first time resource based on the start information and the length information may be: The communications device determines the third time resource based on the start information, the length information, and the period information.

The period information may indicate a repeat period of a subframe set in the third time resource.

Optionally, subframes of the third time resource are [m+offset, m+offset+duration−1], and the subframes periodically repeat based on period. That is, the third time resource further includes subframes [m+offset+period, m+offset+duration−1+period], subframes [m+offset+2*period, m+offset+duration−1+2*period], and the like, where offset is an offset value determined based on the offset information, a subframe m is a reference subframe of the offset value (namely, the preset subframe), (m+offset) is a start location of the second time resource, duration is a time length determined based on the length information, and period is a repeat period determined based on the period information.

Alternatively, subframes of the third time resource are [m+offset, m+offset+duration−1], and the subframes periodically repeat based on period*P. That is, the third time resource further includes subframes [m+offset+period*P, m+offset+duration−1+period*P], subframes [m+offset+2*period*P, m+offset+duration−1+2*period*P], and the like, where P is an integer greater than 1.

The repeat period may be set to a resource reservation gap used by the terminal to send data. If period indicates a repeat period of each subframe set in the third time resource, then period may be set to the resource reservation gap used by the terminal to send data; or if period*P indicates a repeat period of each subframe set in the third time resource, then period may be set to a value that is equal to a resource reservation (resource reservation) field indicated by the terminal in sidelink control information (Sidelink Control Information, SCI).

For example, subframes of the third time resource are [m+offset, m+offset+duration−1], and the subframes periodically repeat based on period. That is, the third time resource further includes subframes [m+offset+period, m+offset+duration−1+period] and [m+offset+2*period, m+offset+duration−1+2*period]. Assuming that m=0, offset=8000, duration=10, and period=1000, indexes of subframes of the third time resource may be expressed as [8000, 8009], [9000, 9009], and [10000, 10009]. In an LTE system, if every ten subframes form one frame, a subframe with an index 8000 is a subframe 0 in SFN/DFN #800 a subframe with an index 8001 is a subframe 1 in SFN/DFN #800, and so on. Details are not repeated.

If the terminal is allowed to use only one resource reservation gap, the indication information may not include the period information. Instead, a default value may be used, for example, a default value of the repeat period is preconfigured as 1000. In this case, it may be determined that the third time resource includes subframes [m offset, m+offset+duration−1], and the subframes repeat over a period of 1000, for example, the third time resource includes subframes [m+offset+1000, m+offset+duration+999].

Further, the communications device may obtain resource pool information. Alternatively, the resource pool information may be carried in the indication information. This is not limited herein. It should be noted that when a subframe (a subframe of the third time resource) that is used for a V2X service and that is allowed to be used by the terminal is determined based on the indication information, an index that numbers a subframe possibly belonging to a resource pool is used. Different resource pools may include different subframe sets. That is, sets (t_0, t_1, t_2, . . . , t_i, . . . , t_max) are different. Therefore, the resource pool needs to be further indicated. Specifically, a resource pool for sending a TB may be indicated. Certainly, the resource pool may not be indicated in the indication information. Instead, a default value of the resource pool may be preconfigured in the communications device, that is, a default resource pool is used.

If the communications device is a terminal, the resource pool information is used to indicate a resource pool used when the terminal sends or receives a signal in sidelink. If the communications device is a base station, the resource pool information is used to indicate a resource pool used when a terminal interacting with the base station sends or receives a signal in sidelink.

It should be noted that in V2X, not all subframes belong to a resource pool used for V2X communication. For example, in an LTE system, a total quantity of subframes in an SFN/DFN period is 10240, subframes that may belong to the resource pool are (t_0, t_1, t_2, . . . , t_i, . . . , t_max, where 0≤t_i<10240, t_i is a subframe index relative to a subframe #0 in SFN/DFN #0, that is, a first index, and the subframes are sorted in ascending order of subframe indexes. If i is an index that numbers only the subframe set that belongs to the resource pool used for the V2X communication, i is referred to as a second index. For example, indexes of (t_0, t_1, t_2, . . . , t_i, t_max) are (0, 1, 2, 5, 6, 7, 9, . . . ).

The index used for determining the subframe in the third time resource may be the first index or the second index.

If the index used for determining the subframe in the third time resource is the second index, optionally, that the communications device determines the third time resource based on the start information, the length information, and the period information may be: determining that subframes of the third time resource are [t_(m+offset), t_(m+offset+duration−1)], and the subframes periodically repeat based on period or period multiplied by a value P, for example, the third time resource includes subframes [t_(m+offset+period*P) and t_(m+offset+duration−1+period*P)], where offset is an offset value determined based on the offset information, a subframe t_m is a reference subframe of offset, and (t_m+offset) is a start location of the third time resource. In other words, offset is an offset relative to the subframe t_m. If m=0, offset is an offset relative to a subframe t_0.

If the first index is used for offset and duration, and the second index is used for period, optionally, that the communications device determines the third time resource based on the start information, the length information, and the period information may be: determining that subframes of the third time resource are [m+offset, m+offset+duration−1)], and the subframes periodically repeat based on period or period multiplied by a value P, for example, the third time resource includes subframes [n, n+'duration'−1] and [b, b−'duration'−1], where t_a=m+offset, n=t_(a+period*P), and b=t_(a+period*P*2). If a subframe m is a start of SFN/DFN #0, m=0.

Further, the indication information may further include a quantity of repetitions (repetition) of the first time resource. Optionally, the quantity of repetitions of the first time resource may be set to a value of a resource reselection counter of the terminal. Specifically, when the first time resource includes the second time resource, a quantity of repetitions of the second time resource is indicated; or when the first time resource includes the third time resource, a quantity of repetitions of the third time resource is indicated.

For example, when the quantity of repetitions of the third time resource is 3, the indicated third time resource includes subframes [m+offset, m+offset+duration−1], subframes [m+offset+period*P, m+offset+duration−1+period*P], and subframes [m+offset+period*P*2, m+offset+duration1+period*P*2].

In the foregoing embodiment, a quantity of bits used by duration may not exceed 7, a quantity of bits used by period may not exceed 4, a quantity of bits used by a resource pool may not exceed 3, and a quantity of bits used by a quantity of repetitions (repetition) may not exceed 4. It can be learned that indication overheads are greatly reduced.

Optionally, the communications device may alternatively indicate both the second time resource and the third time resource. Correspondingly, a communications device receiving the indication information may determine both the second time resource and the third time resource.

In specific implementation, the indication information may include the offset information, the length information, and the period information. Alternatively, the indication information includes the offset information and the period information, and preset length information is used as the length information. Alternatively, the indication information includes the offset information, and preset default values of the period information and the length information are used. This is not limited herein.

The communications device receiving the indication information may determine the second time resource and the third time resource by using the method in the foregoing embodiment. For example, it is determined that the second time resource includes subframes [m+offset−P*k, m+offset+duration−1−P*k]; and it is determined that the third time resource includes subframes [m+offset, m+offset+duration−1], and the subframes periodically repeat based on period or period multiplied by a value P, for example, the third time resource includes subframe [m+offset+period*P, m+offset+duration−1+period*P] and subframes [m+offset+period*2*P, m+offset+duration−1+period*2*P].

Alternatively, it is determined that the second time resource includes subframes [m+offset−P*k, m+offset+duration−1P*k]; and it is determined that the third time resource includes subframes [m+offset, m+offset+duration−1], and the subframes periodically repeat on the second index (the second index is used for period) based on period or period multiplied by a value P, for example, the third time resource includes subframes [n, n+duration−1] and subframes [b, b+duration−1], where t_a=m+offset, n=t_(a+period*P), and b=t_(a+period*P*2). Details are not repeated herein.

Optionally, if the communications device supports a short resource reservation gap, that is, the resource reservation gap is less than a preset time threshold, for example, the preset time threshold is equal to P. In this case, an implementation in which the first time resource includes the second time resource is enhanced to some extent.

The second time resource includes at least one subframe set, and the length information duration indicates a quantity of subframes included in each subframe set. When the communications device determines the second time resource based on the offset information, the length information, and the first parameter, in an implementation, the second time resource includes subframes [m+offset−P*k, m+offset+duration+1−P*k]. For example, the second time resource includes subframes [m+offset−100, m+offset+duration−101], and a value of k may not include 1.

If the second parameter M is introduced, the second time resource includes [m+offset−P*k, m+offset+duration+M−1−P*k].

Alternatively, in another implementation, the second time resource includes subframes [m+offset−P*k, m+offset+a'−1−P*k], where a'=min (duration, k_max*P), and 0<k<1. k_max is a maximum value in a value set of k.

If the second parameter M is introduced, a'=min (duration+M, k_max*P).

Alternatively, in still another implementation, the indication information includes two pieces of offset information: offset and offset2. The offset and the offset2 may be the same or different. The second time resource may include subframes [m+offset2, m+offset2+a'−1], where a'=min (duration, k_max*P), and 0<k<1. k_max is a maximum value in a value set of k. The offset2 is an offset value relative to a subframe m, or the offset2 is an offset value relative to a subframe (m+offset).

If the second parameter M is introduced, a'=min (duration+M, k_max*P).

Optionally, the second offset information offset2 may also be preconfigured in the communications device. This is not limited herein.

Alternatively, in yet another implementation, the indication information may include a plurality of pieces of offset information. That is, in addition to the offset, one or more offset_i may be further included. The offset_i is also an offset value relative to a preset subframe (the subframe m), or an offset value relative to the subframe m+offset).

The second time resource may include subframes [m+offset m+offset_i+duration_i−1], where duration_i=min (duration, k_i*P). k_i is a value of k and is less than 1. in other words, duration_i indicates a time resource segment in the second time resource.

If the second parameter M is introduced, duration_i=min (duration+M, k_i*P).

Figure 2:
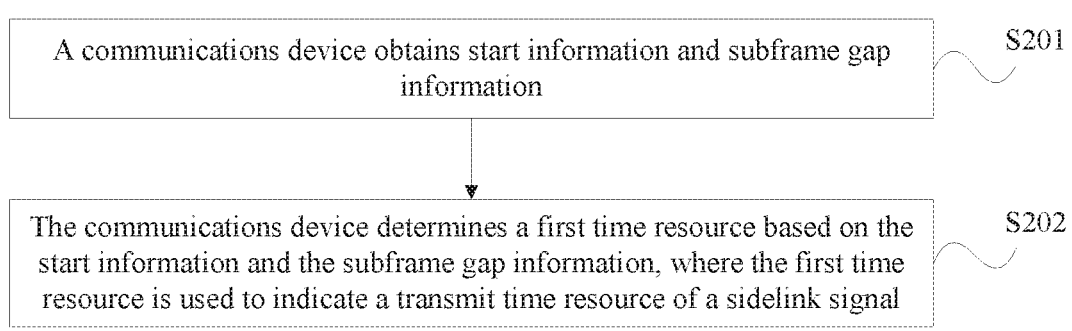
FIG. 2 is a schematic flowchart of a terminal communication method according to another embodiment of this application.

FIG. 2 is a schematic flowchart of a terminal communication method according to another embodiment of this application. As shown in FIG. 2, the method includes the following steps.

S201: A communications device obtains start information and subframe gap information. The start information is used to indicate a start location of a first time resource, and the subframe gap information is used to indicate a gap between two adjacent subframes in the first time resource.

In this embodiment, subframes may be continuous or not continuous. After a start subframe is determined based on the start information, all subframes included in the first time resource may be obtained by sequentially performing deducing based on the subframe gap information.

S202: The communications device determines the first time resource based on the start information and the subframe gap information.

The first time resource may include one or more subframes, and the first time resource is used to indicate a transmit time resource of a sidelink signal.

The first time resource in this embodiment is similar to the third time resource in the foregoing embodiment. They are both used for sending a sidelink signal. In other words, in a subsequent method embodiment based on FIG. 2, the first time resource is a transmit time resource of a sidelink signal.

When the communications device is a terminal, in the first time resource, the terminal may first send a sidelink signal. Optionally, in the first time resource, the terminal may not send an uplink signal or receive a downlink signal.

When the communications device is a base station, the base station determines that a terminal interacting with the base station first sends a sidelink signal in the first time resource. Then when the base station schedules the terminal to send an uplink signal or receive a downlink signal, the first time resource may be eschewed.

In this embodiment, the communications device obtains the start information and the subframe gap information, determines the first time resource based on the start information and the subframe gap information, and further determines the transmit time resource of the sidelink signal based on the first time resource. This implements that the transmit time resource of the sidelink signal may be determined by using a few bits, and there is no need to determine, one by one based on a value of a bit string, whether each subframe belongs to the first time resource. Therefore, overheads are greatly reduced.

Optionally, similar to that in the foregoing embodiment, the start information and the subframe gap information may be indicated by using indication information. In other words, the communications device receives indication information sent by another communications device, and the indication information includes offset information and the subframe gap information. Alternatively, the indication information includes offset information. Preset subframe gap information is used as the subframe gap information, that is, a default value is preset.

The communications device determines the start information based on the offset information.

Optionally, the communications device determines the start information based on the offset information and preset reference information. The preset reference information may be a preset subframe, and the start location may be a location deviated from the preset subframe.

Specifically, the offset information may be an offset of a first subframe in the first time resource relative to a preset subframe, where the preset subframe may be a start of SFN/DFN #0, that is, a subframe 0 in SFN/DFN #0. The offset information may be set to an offset of a first transmit subframe, for transmitting a TB, relative to the preset subframe, or an offset of a second transmit subframe, for transmitting a TB, relative to the preset subframe. However, this does not constitute a limitation.

Optionally, the first time resource determined by the communications device based on the start information and the subframe gap information may be represented by a subframe (m+offset) and a subframe (m+offset+retransmission offset), where offset is an offset value determined based on the offset information, a subframe m is a reference subframe (namely, the preset subframe) of the offset value, retransmission offset is a subframe gap determined based on the subframe gap information, and (m+offset) is a start location of the first time resource.

It may be understood that the first time resource includes the subframe (m+offset) and a subframe that is at a gap of "retransmission offset" subframes after the subframe (m+offset).

Further, the communications device may obtain period information. The period information may be used to indicate a repeat period of each subframe set in the first time resource.

Optionally, that the communications device determines the first time resource based on the start information and the subframe gap information may be: The communications device determines the first time resource based on the start information, the subframe gap information, and the period information.

Optionally, a first period in the first time resource includes a subframe (m+offset) and a subframe (m+offset+retransmission offset), and the subframes periodically repeat based on period or period multiplied by a value P. For example, the first time resource includes a subframe (m+offset+period*P), a subframe n+offset+retransmission offset+period*P), a subframe (m offset+2*period*P), and a subframe (m+offset+retransmission offset+2*period*P). This is not limited herein.

If a subframe in is a start of SFN/DFN #0, m=0. If the subframe m is a start of SFN/DFN #0, and a value of offset is set to an offset of a first transmit subframe, for transmitting a TB, relative to a preset subframe, a value of retransmission offset is set to an offset of a second transmit subframe, for transmitting a TB, relative to the first transmit subframe, and period is set to a value that is equal to a resource reservation (resource reservation) field indicated by the terminal in SCI.

For example, m=0, offset=8000, retransmission offset=3, and period=1000. The first time resource includes a subframe 8000, a subframe 8003, a subframe 9000, a subframe 9003, a subframe 10000, a subframe 10003, and the like. Assuming that in an LTE system, every ten subframes form one frame, then the subframe 8000 is a subframe 0 in SFN/DFN #800, the subframe 8003 is a subframe 3 in SFN/DFN #800, and so on.

If the terminal is allowed to use only one resource reservation gap, the indication information may not include the period information, and preset period information is used instead. For example, if the preset period information of the terminal is 1000, the terminal or the base station determines, based on offset and retransmission offset, that subframes of the first time resource include a subframe (m+offset) and a subframe (m+offset+retransmission offset) that are in a first period, and the subframes periodically repeat based on a period of 1000. For example, the subframes of the first time resource include a subframe (m+offset+1000), a subframe (m+offset+retransmission offset+1000), a subframe (m+offset+2000), and a subframe (m+offset+retransmission offset+2000).

Further, similar to that in the foregoing embodiment, the communications device may further obtain resource pool information.

Alternatively, the resource pool information may be carried in the indication information. This is not limited herein. It should be noted that when a subframe (a subframe of the first time resource) that is used for a V2X service and that is allowed to be used by the terminal is determined based on the indication information, an index that numbers a subframe possibly belonging to a resource pool is used. Different resource pools may belong to different subframe sets. That is, sets (t_0, t_1, t_2, ..., t_i, ... t_max) are different. Therefore, the resource pool needs to be further indicated. Specifically, a resource pool for sending a TB may be indicated. Certainly, the resource pool may not be indicated in the indication information. Instead, a default value of the resource pool may be preconfigured in the communications device, that is, a default resource pool is used.

If the communications device is a terminal, the resource pool information is used to indicate a resource pool used when the terminal sends or receives a signal in sidelink. If the communications device is a base station, the resource pool information is used to indicate a resource pool used when a terminal interacting with the base station sends or receives a signal in sidelink.

It should be noted that in V2X, not all subframes belong to a resource pool used for V2X communication. For example, in an LTE system, a total quantity of subframes in an SFN/DFN period is 10240, subframes that may belong to the resource pool are (t_0, t_1, t_2, ... t_i, ..., t_max), where 0≤t_i<10240, t_i is a subframe index relative to a subframe #0 in SFN/DFN #0, that is, a first index, and the subframes are sorted in ascending order of subframe indexes. If i is an index that numbers only the subframe set that belongs to the resource pool used for the V2X communication, i is referred to as a second index. For example, indexes of (t_0, t_1, t_2, ..., t_i, ..., t_max) are (0, 1, 2, 5, 6, 7, 9, ...).

When the first time resource is determined, if the second index is used for all of offset, retransmission offset, and period, the first period of the first time resource includes a subframe t_(m+offset) and a subframe t_(m+offset+retransmission offset), and the subframes periodically repeat based on period or period multiplied by a value P. For example, the first time resource includes a subframe t_(m+offset+period), a subframe t_(m+offset+retransmission offset+period), a subframe t_(m+offset+2*period), and a subframe t_(m+offset+retransmission offset+2*period), where a subframe t_m is a reference subframe of offset. In other words, offset is an offset relative to the subframe t_m. If m=0, offset is an offset relative to a subframe t_0.

Optionally, when the first time resource is determined, if the first index is used for offset, and the second index is used for retransmission offset and period, the first period of the first time resource includes a subframe t_n (where t_n=m+offset) and a subframe t_(n+retransmission offset), and the subframes periodically repeat based on period or period multiplied by a value P. For example, the first time resource includes a subframe t_(n+period), a subframe t_(n+retransmission offset+period), a subframe t_(n+2*period), and a subframe t_(n+retransmission offset+2*period), where a subframe m is a reference subframe of offset. In other words, offset is an offset relative to the subframe m. If the subframe m is a start of SFN/DFN #0, m=0.

Further, the indication information may include a quantity of repetitions (repetition of the first time resource. The quantity of repetitions of the first time resource may be set to a value of a resource reselection counter of the terminal. For example, when the quantity of repetitions of the first time resource is 3, the first time resource repeats 3 times, and subframes of the first time resource include subframes (m+offset), (m+offset+retransmission offset), (m+offset+period*P), (m+offset+retransmission offset+period*P), (m+offset+period*P*2), and (m+offset+retransmission offset+period*P*2).

Optionally, the communications device may further obtain a relative offset value of the first time resource and a second time resource.

The indication information may further include the relative offset value of the first time resource and the second time resource. The second time resource herein is the same as the second time resource in the foregoing embodiment. That is, the communications device receives the sidelink signal based on the second time resource.

That the communications device determines the first time resource based on the start information and the subframe gap information includes: The communications device determines the first time resource based on the start information, the subframe gap information, and the relative offset value of the first time resource and the second time resource.

Optionally, the relative offset value of the first time resource and the second time resource may be carried in the indication information.

The indication information herein is indication information that indicates the first time resource, and the indication information may include the offset information, the subframe gap information, and the relative offset value of the first time resource and the second time resource. Alternatively, the indication information may include the offset information and the relative offset value of the first time resource and the second time resource. Preset subframe gap information is used as the subframe gap information.

Specifically, the communications device may further obtain indication information that indicates the second time resource. For the indication information that indicates the second time resource, refer to the embodiment shown in FIG. 1, and details are not repeated herein. Specifically, the indication information that indicates the second time resource may include offset information, duration information, and the like of the second time resource. The offset information may be an offset value of the second time resource.

Alternatively, indication information received by the communications device and sent by another communications device indicates both the first time resource and the second time resource. The indication information includes the offset information, the subframe gap information, the relative offset value of the first time resource and the second time resource, and the length information. The offset information indicates a start location of the first time resource, and also indicates a start location of the second time resource.

Optionally, if each subframe set in the first time resource repeats based on the period information, the relative offset value of the first time resource and the second time resource may indicate an offset of an offset value of a first transmit subframe in a first period of the first time resource relative to the second time resource, or an offset of an offset value of a second transmit subframe in the first period of the first time resource relative to the second time resource.

Specifically, the communications device may determine, according to the method provided in the foregoing embodiment, that the second time resource includes a subframe [m+offset−P*k, m+offset+duration−1−P*k]. For the parameters, refer to the explanations provided in the foregoing embodiment. Further, it is determined that the first time resource includes subframes m+offset+offset_tx) and (m+offset+offset_tx+retransmission offset), and the subframes periodically repeat based on period or period multiplied by a value P. For example, the first time resource includes a subframe n+offset+offset_tx+period*P), a subframe (m+offset+offset_tx+retransmission offset+period*P), a subframe (m+offset+offset_tx+2*period*P), and a subframe (m+offset+offset_tx+retransmission offset+2*period*P), where offset_tx indicates the relative offset value of the first time resource and the second time resource.

In another implementation, if the indication information includes the resource pool information, the second index is used for both retransmission offset and period. The communications device may determine, according to the method provided in the foregoing embodiment, that the second time resource includes subframes [m+offset−P*k m+offset+duration−1−P*k]. Further, it is determined that the first time resource includes a subframe t_n and a subframe t_(n+offset), and the subframes periodically repeat on the second index based on period or period multiplied by a value P. For example, the first time resource includes a subframe t_(n+period*P), a subframe t_(n+retransmission offset+period*P), a subframe t_(n+period*P*2), and a subframe t_(n+retransmission offset+period*P*2), where t_n=m+offset+offset_tx.

Figure 3:
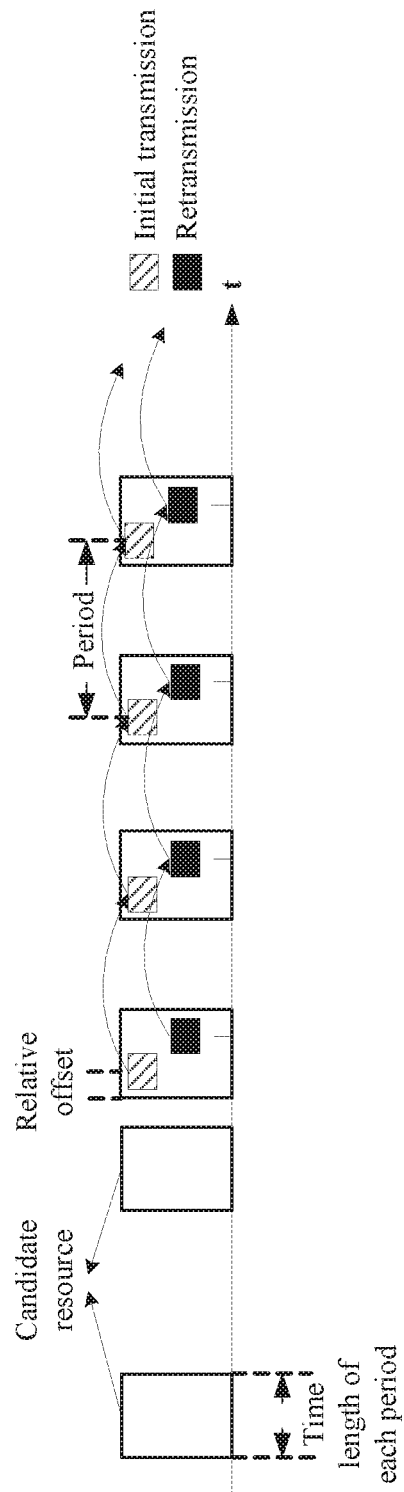
FIG. 3 is a schematic diagram of a time resource in a terminal communication method according to this application.

FIG. 3 is a schematic diagram of a time resource in a terminal communication method according to this application. As shown in FIG. 3, a communications device determines a first time resource based on start information, subframe gap information, and a relative offset value of a first time resource and a second time resource.

Further, the communications device determines the second time resource based on the start information and length information, and that the communications device determines the second time resource based on the start information and length information may be: The communications device determines the second time resource based on the start information, the length information, and the relative offset value of the first time resource and the second time resource.

Optionally, the communications device determines that subframes of the second time resource includes subframes [m+offset−offset_rx−100*k, m+offset−offset_rx+duration−1−100*k], where offset_rx indicates the relative offset value of the first time resource and the second time resource, and offset_rx may be set to an offset of an offset value of a first transmit subframe in a first period of the second time resource relative to the second time resource, or an offset of an offset value of a second transmit subframe in a first period of the second time resource relative to the second time resource.

Further, it is determined that the first time resource includes a subframe (m+offset) and a subframe m+offset+retransmission offset), and the subframes periodically repeat based on period or period multiplied by a value P. For example, the first time resource includes a subframe (m+offset+period*P), a subframe (m+offset+retransmission offset+period*P), a subframe (m+offset+period*P*2), and a subframe (m+offset+retransmission offset+period*P*2).

Alternatively, in another implementation, based on that the communications device obtains resource pool information, a second index is used for both retransmission offset and period. The communications device determines that a subframe of the second time resource includes subframes [m+offset−offset_rx−100*k, m+offset−offset_rx+duration−1−100*k]. Further, it is determined that the first time resource includes a subframe t_n and a subframe t_(n+retransmission offset), and the subframes periodically repeat on the second index based on period or period multiplied by a value P. For example, the first time resource includes a subframe t_(n+period*P), a subframe t_(n+retransmission offset+period*P), a subframe t_(n+period*P*2), and a subframe t_(n+retransmission offset+period*P*2), where t_n=m+offset.

In the foregoing embodiment, a quantity of bits used by duration may not exceed 7, a quantity of bits used by retransmission offset may not exceed 4, a quantity of bits used by period may not exceed 4, a quantity of bits used by a resource pool may not exceed 3, and a quantity of bits used by a quantity of repetitions (repetition) may not exceed 4. It can be learned that indication overheads are greatly reduced.

Figure 4:
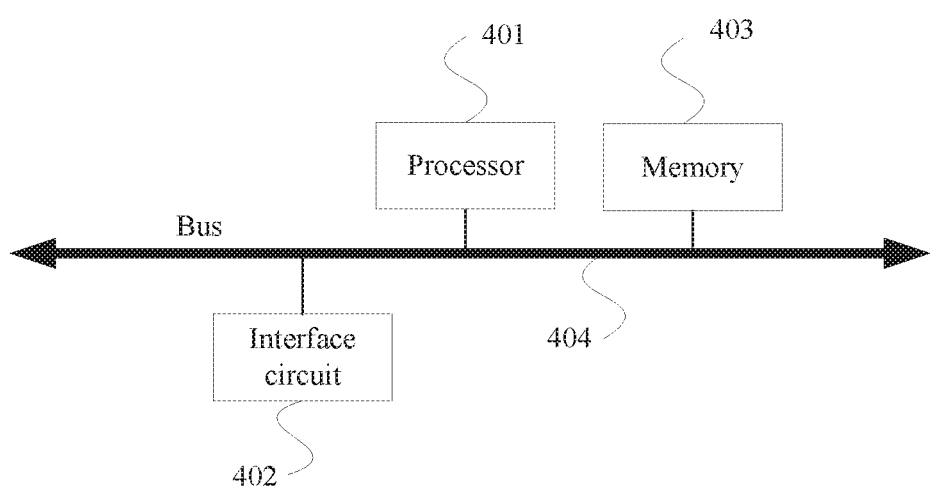
FIG. 4 is a schematic structural diagram of a communications device according to an embodiment of this application.

FIG. 4 is a schematic structural diagram of a communications device according to an embodiment of this application. The communications device may be a terminal or a base station. This is not limited herein.

As shown in FIG. 4, the apparatus includes a processor 401, a memory 402, an interface circuit 403, and a bus 404.

The processor 401, the memory 402, and the interface circuit 403 are connected and communicate with each other by using the bus 404. The processor 401 sends or receives information, such as control information and data, by using the interface circuit 403.

The memory 402 stores a set of program code, and the processor 401 invokes the program code stored in the memory 402 to perform the following operations:

obtaining start information and length information, where the start information is used to indicate a start location of a first time resource; and determining the first time resource based on the start information and the length information, where the first time resource is used to indicate a transmit or receive time resource of a sidelink signal.

Optionally, the first time resource includes at least one subframe set, and each subframe set includes at least one subframe; and the length information is used to determine a quantity of subframes in each subframe set.

The processor 401 is specifically configured to receive indication information, where the indication information includes offset information and the length information; or obtain preset length information, and receive the indication information, where the indication information includes offset information: and determine the start information based on the offset information.

Optionally, the first time resource includes a second time resource, and the communications device receives the sidelink signal based on the second time resource.

The processor 401 is specifically configured to determine the second time resource based on the start information, the length information, and a first parameter; or determine the second time resource based on the start information, the length information, the first parameter, and a second parameter.

The first time resource includes a third time resource, and the communications device sends the sidelink signal based on the third time resource.

The processor 401 is further configured to obtain period information.

Correspondingly, the processor 401 is specifically configured to determine the third time resource based on the start information, the length information, and the period information.

In another implementation, the processor 401 is specifically configured to receive indication information, where the indication information includes the period information; or obtain preset period information.

Further, the processor 401 is further configured to obtain resource pool information, where when the communications device is a terminal, the resource pool is used to indicate a resource pool used when the terminal sends or receives a signal in sidelink; or when the communications device is a base station, the resource pool is used to indicate a resource pool used when a terminal interacting with the base station sends or receives a signal in sidelink.

Referring to FIG. 4, a communications device provided by another embodiment of this application has a structure the same as that shown in FIG. 4. A processor 401 invokes program code stored in a memory 402 to perform the following operations:

obtaining start information and subframe gap information, where the start information is used to indicate a start location of a first time resource, and the subframe gap information is used to indicate a gap between two adjacent subframes in the first time resource; and determining the first time resource based on the start information and the subframe gap information, where the first time resource is used to indicate a transmit time resource of a sidelink signal.

Optionally, the processor 401 is specifically configured to receive indication information, where the indication information includes offset information and the subframe gap information; or obtain preset subframe gap information, and receive indication information, where the indication information includes offset information; and determine the start information based on the offset information.

Optionally, the processor 401 is further configured to obtain period information. Further, the processor 401 is specifically configured to determine the first time resource based on the start information, the subframe gap information, and the period information.

Optionally, the processor 401 is further configured to obtain a relative offset value of the first time resource and a second time resource, where the communications device receives the sidelink signal based on the second time resource. Further, the processor 401 is specifically configured to determine the first time resource based on the start information, the subframe gap information, and the relative offset value of the first time resource and the second time resource.

Optionally, the processor 401 is further configured to obtain resource pool information, where when the communications device is a terminal, the resource pool is used to indicate a resource pool used when the terminal sends or receives a signal in sidelink; or when the communications device is a base station, the resource pool is used to indicate a resource pool used when a terminal interacting with the base station sends or receives a signal in sidelink.

The apparatus is configured to perform the foregoing method embodiments. An implementation principle and a technical effect of the apparatus are similar to those of the method embodiments. Details are not repeated herein.

Figure 5:
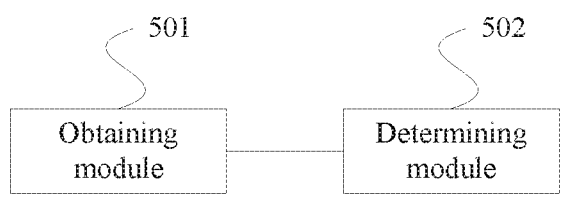
FIG. 5 is a schematic structural diagram of a communications device according to another embodiment of this application.

FIG. 5 is a schematic structural diagram of a communications device according to another embodiment of this application. The communications device may be a terminal or a base station. This is not limited herein.

As shown in FIG. 5, the apparatus includes an obtaining module 501 and a determining module 502.

The obtaining module 501 is configured to obtain start information and length information, where the start information is used to indicate a start location of a first time resource.

The determining module 502 is configured to determine the first time resource based on the start information and the length information, where the first time resource is used to indicate a transmit or receive time resource of a sidelink signal.

Optionally, the first time resource includes at least one subframe set, and each subframe set includes at least one subframe; and the length information is used to determine a quantity of subframes in each subframe set.

Optionally, the obtaining module 501 is specifically configured to receive indication information, where the indication information includes offset information and the length information; or obtain preset length information, and receive indication information, where the indication information includes offset information; and determine the start information based on the offset information.

Optionally, the first time resource includes a second time resource, and the communications device receives the sidelink signal based on the second time resource.

The determining module 502 is specifically configured to determine the second time resource based on the start information, the length information, and a first parameter; or determine the second time resource based on the start information, the length information, the first parameter, and a second parameter.

Optionally, the first time resource includes a third time resource, and the communications device sends the sidelink signal based on the third time resource.

Optionally, the obtaining module 501 is further configured to obtain period information.

Correspondingly, the determining module 502 is specifically configured to determine the third time resource based on the start information, the length information, and the period information.

Optionally, the obtaining module 501 is specifically configured to receive indication information, where the indication information includes the period information; or obtain preset period information.

Further, the obtaining module 501 is configured to obtain resource pool information, where when the communications device is a terminal, the resource pool is used to indicate a resource pool used when the terminal sends or receives a signal in sidelink; or when the communications device is a base station, the resource pool is used to indicate a resource pool used when a terminal interacting with the base station sends or receives a signal in sidelink.

An implementation principle and a technical effect of the apparatus are similar to those of the method embodiment corresponding to FIG. 1. Details are not repeated herein.

Further, a communications device provided by another embodiment of this application has a structure the same as that of the communications device shown in FIG. 5, and includes an obtaining module 501 and a determining module 502.

The obtaining module 501 is configured to obtain start information and subframe gap information, where the start information is used to indicate a start location of a first time resource, and the subframe gap information is used to indicate a gap between two adjacent subframes in the first time resource.

The determining module 502 is configured to determine the first time resource based on the start information and the subframe gap information, where the first time resource is used to indicate a transmit time resource of a sidelink signal.

Optionally, the obtaining module 501 is specifically configured to receive indication information, where the indication information includes offset information and the subframe gap information; or is specifically configured to obtain preset subframe gap information, and receive indication information, where the indication information includes offset information; and determine the start information based on the offset information. Correspondingly, the determining module 502 is further configured to determine the start information based on the offset information.

Optionally, the obtaining module 501 is further configured to obtain period information. Correspondingly, the determining module 502 is specifically configured to determine the first time resource based on the start information, the subframe gap information, and the period information.

Optionally, the obtaining module 501 is further configured to obtain a relative offset value of the first time resource and a second time resource, where the communications device receives the sidelink signal based on the second time resource. Correspondingly, the determining module 502 is specifically configured to determine the first time resource based on the start information, the subframe gap information, and the relative offset value of the first time resource and the second time resource.

Optionally, the obtaining module 501 is further configured to obtain resource pool information, where when the communications device is a terminal, the resource pool is used to indicate a resource pool used when the terminal sends or receives a signal in sidelink; or when the communications device is a base station, the resource pool is used to indicate a resource pool used when a terminal interacting with the base station sends or receives a signal in sidelink.

An implementation principle and a technical effect of the apparatus are similar to those of the method embodiment corresponding to FIG. 2. Details are not repeated herein.

The content performed by the foregoing modules may be performed by the processor in the apparatus. When communicating and interacting with another device, the processor may send or receive a signal by using the interface circuit.

Methods or algorithm steps described with reference with the content disclosed in the embodiments of the present invention may be implemented by hardware, or may be implemented by a processor by executing a software instruction. The software instruction may include a corresponding software module. The software module may be stored in a random access memory (Random Access Memory, RAM), a flash memory, a read-only memory (Read Only Memory, ROM), an erasable programmable read only memory (Erasable Programmable ROM, EPROM), an electrically erasable programmable read only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in an ASIC. In addition, the ASIC may be located in a base station or a terminal. Certainly, the processor and the storage medium may exist in a base station or a terminal as discrete components.

A person skilled in the art should be aware that in the foregoing one or more examples, functions described in the embodiments of the present invention may be implemented by hardware, software, firmware, or any combination thereof. When the functions are implemented by software, the functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

In the foregoing specific implementations, the objectives, technical solutions, and benefits of the embodiments of the present invention are further described in detail. It should be understood that the foregoing descriptions are merely specific implementations of the embodiments of the present invention, but are not intended to limit the protection scope of the embodiments of present invention. Any modification, equivalent replacement, or improvement made based on technical solutions of the embodiments of the present invention shall fall within the protection scope of the embodiments of the present invention.

What is claimed is:

1. A terminal communication method implemented by a communications device, the method comprising:
   obtaining start information and length information, wherein the start information indicates a start location of a first time resource that indicates a transmit or receive time resource of a sidelink signal, wherein the first time resource comprises a subframe set, wherein the subframe set comprises at least one subframe, and wherein the length information indicates a quantity of the at least one subframe set; and
   determining the first time resource based on the start information and the length information, wherein the first time resource comprises a second time resource;
   receiving the sidelink signal based on the second time resource; and
   determining the second time resource based on the start information, the length information, a first parameter value representing a monitoring subframe, and a second parameter value representing the minimum quantity of subframes in the second time resource.

2. The method of claim 1, wherein the obtaining the start information and the length information comprises obtaining preset length information and receiving the indication information, wherein the indication information comprises the offset information.

3. The method of claim 1, wherein the first time resource comprises a second time resource, wherein the method further comprises:
   receiving the sidelink signal based on the second time resource; and
   determining the second time resource based on the start information, the length information, and the first parameter.

4. The method of claim 1, wherein the first time resource comprises a third time resource, and wherein the method further comprises:
   sending the sidelink signal based on the third time resource
   obtaining period information; and
   determining the third time resource based on the start information, the length information, and the period information.

5. The method of claim 4, wherein the obtaining the period information comprises:
   receiving indication information that comprises the period information; or
   obtaining preset period information.

6. The method of claim 1, wherein the method further comprises obtaining resource pool information, wherein when the communications device is a terminal, the resource pool information indicates a resource pool used when the terminal sends or receives a signal in sidelink, or wherein when the communications device is a base station, the resource pool information indicates a resource pool used when a terminal interacting with the base station sends or receives a signal in sidelink.

7. A terminal communication method implemented by a communications device, the method comprising:
   obtaining start information and subframe gap information, wherein the start information indicates a start location of a first time resource, wherein the first time resource indicates a transmit time resource of a sidelink signal, wherein the first time resource comprises a second time resource, and wherein the subframe gap information indicates a gap between two adjacent subframes in the first time resource;
   determining the first time resource based on the start information and the subframe gap information independent of a bit string that identifies each of a plurality of subframes corresponding to the first time resource;
   receiving the sidelink signal based on the second time resource; and
   determining the second time resource based on the start information, the length information, a first parameter value representing a monitoring subframe, and a second parameter value representing the minimum quantity of subframes in the second time resource.

8. The method of claim 7, wherein the obtaining the start information and the subframe gap information comprises:
   receiving indication information that comprises offset information and the subframe gap information; and
   determining, by the communications device, the start information based on the offset information.

9. The method of claim 8, wherein the method further comprises obtaining period information, and wherein the determining the first time resource based on the start information and the subframe gap information comprises determining the first time resource based on the start information, the subframe gap information, and the period information.

10. The method of claim 7, wherein the method further comprises obtaining a relative offset value of the first time resource and the second time resource, wherein the determining the first time resource based on the start information and the subframe gap information comprises determining the first time resource based on the start information, the subframe gap information, and the relative offset value of the first time resource and the second time resource.

11. The method of claim 7, wherein the method further comprises obtaining, by the communications device, resource pool information, wherein when the communications device is a terminal, the resource pool information indicates a resource pool used when the terminal sends or receives a signal in a sidelink, or wherein when the communications device is a base station, the resource pool information indicates a resource pool used when a terminal interacting with the base station sends or receives a signal in sidelink.

12. A communications device, comprising:
   a memory configured to store a program instruction; and
   a processor coupled to the memory and configured to invoke the program instruction to:
      obtain start information and length information, wherein the start information indicates a start location of a first time resource, wherein the first time resource indicates a transmit or receive time resource of a sidelink signal; and
      determine the first time resource based on the start information and the length information independent of a bit string that identifies each of a plurality of subframes corresponding to the first time resource, wherein the first time resource comprises a second time resource;
      receive the sidelink signal based on the second time resource; and
      determine the second time resource based on the start information, the length information, a first parameter value representing a monitoring subframe, and a second parameter value representing the minimum quantity of subframes in the second time resource.

13. The communications device of claim 12, wherein the first time resource comprises at least one subframe set, wherein each subframe set of the at least one subframe set comprises at least one subframe, and wherein the length information is used to determine a quantity of subframes in each subframe set of the at least one subframe set.

14. The communications device according to claim 12, wherein the processor is configured to:
    receive indication information that comprises offset information and the length information; and
    determine the start information based on the offset information.

15. The communications device of claim 12, wherein the first time resource comprises a third time resource, wherein the communications device sends the sidelink signal based on the third time resource, wherein the processor is further configured to obtain period information, and wherein the processor is configured to determine the third time resource based on the start information, the length information, and the period information.

16. The communications device of claim 15, wherein the processor is configured to:
    receive indication information that comprises the period information; or
    obtain preset period information.

17. The communications device of claim 12, wherein the processor is further configured to obtain resource pool information, wherein when the communications device is a terminal, the resource pool information indicates a resource pool used when the terminal sends or receives a signal in sidelink, or wherein when the communications device is a base station, the resource pool information indicates a resource pool used when a terminal interacting with the base station sends or receives a signal in sidelink.

18. The method of claim 2, further comprising determining the start information based on the offset information.

19. The method of claim 1, wherein the method further comprises obtaining resource pool information, when the communications device is a base station, the resource pool information indicates a resource pool used when a terminal interacting with the base station sends or receives a signal in sidelink.

20. The method of claim 7, wherein the method further comprises obtaining, by the communications device, resource pool information, wherein when the communications device is a base station, the resource pool information indicates a resource pool used when a terminal interacting with the base station sends or receives a signal in sidelink.

* * * * *